July 13, 1937.  L. SAIVES  2,087,166
GEARING MECHANISM
Filed March 20, 1936  2 Sheets-Sheet 1
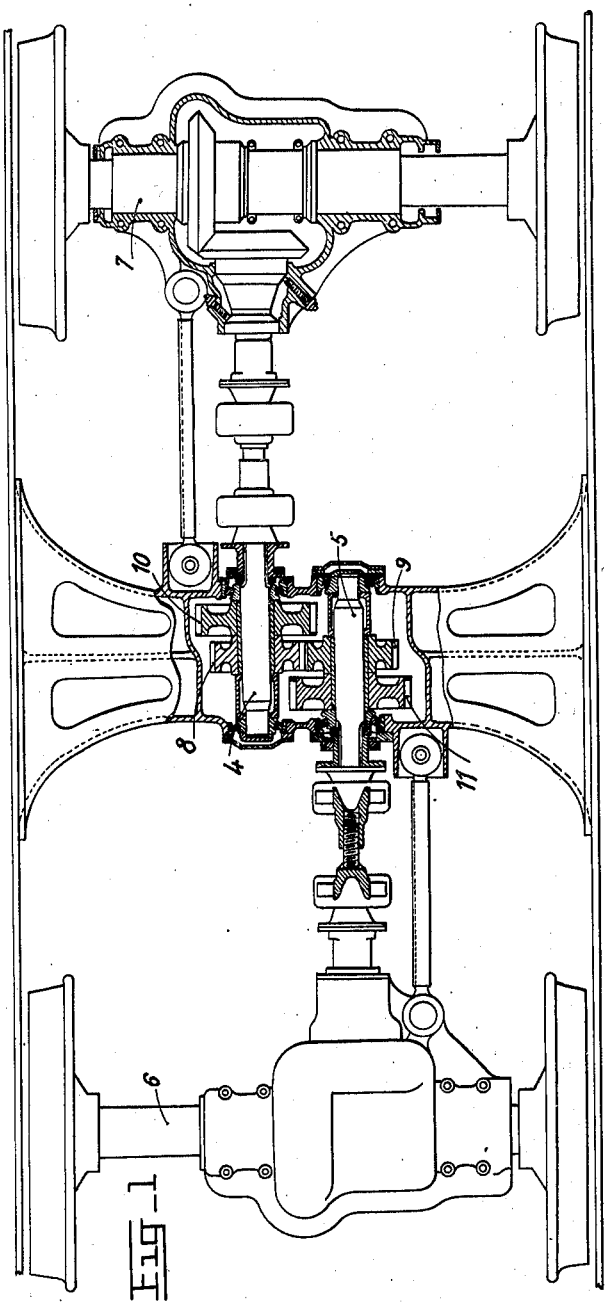
L. Saives
INVENTOR
By: Glascock Downing & Seebold
Attys.

July 13, 1937.                L. SAIVES                2,087,166
                         GEARING MECHANISM
                   Filed March 20, 1936        2 Sheets-Sheet 2
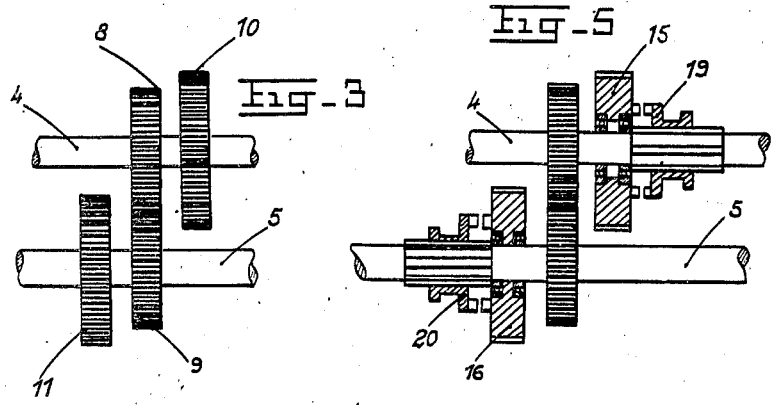
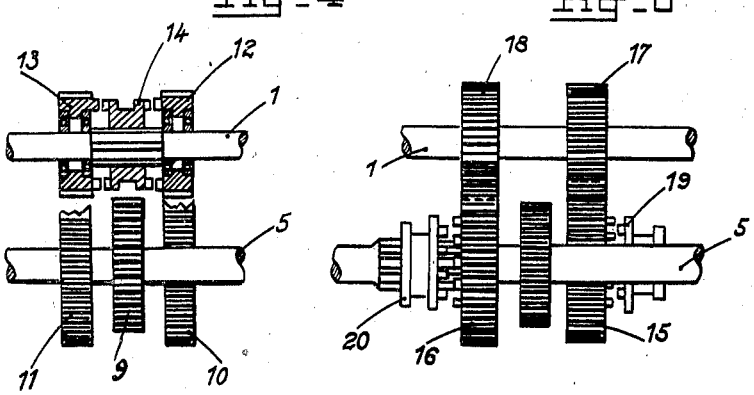
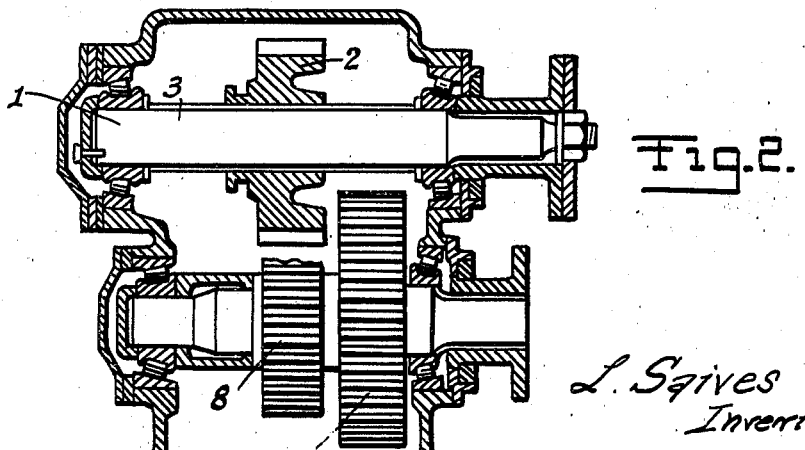
L. Saives
Inventor Patented July 13, 1937

2,087,166

UNITED STATES PATENT OFFICE 2,087,166

GEARING MECHANISM

Leon Saives, Billancourt, France, assignor to Louis Renault, Billancourt, France Application March 20, 1936, Serial No. 69,951
In France April 16, 1935

4 Claims. (Cl. 74—355)

The invention relates to an arrangement for the transmission of reversible rotatory motion in two opposite directions of rotation and arranged to operate in such a manner that the total efficiency shall be the same in either direction of rotation. Proceeding on this idea, a shaft receiving its motion from a motor driven member, either directly or through the intermediary of various members positively rotates a pinion adapted to slide on the said shaft by means of grooves or keys.

Beneath the said shaft are disposed two other shafts designed to propagate the motion in two parallel directions either in the same direction as the original motion or in the reverse direction, the said shafts being connected one to the other by means of two pinions which serve to reverse the direction of motion of the said shafts with respect to each other.

Each of the said shafts also carries another pinion with which the pinion which is adapted to be moved along the primary shaft and which receives its motion from the motor driven member may be placed in gear in such a way as to transmit its motion directly to the one or the other of the said pinions.

The invention is more particularly applicable to the control of a double-axle bogie of a railway carriage, but may be equally well applied to all kinds of transmission, such as the rear axles of vehicles having double driving axles, machine tools, elevating machinery, etc. in which is used a two direction relay for reversing the direction of motion.

In order that the invention may be better understood it will be described more particularly with reference to the accompanying drawings, which represents by way of example an arrangement for the control of a double-axle bogie of a railway carriage.

Fig. 1 represents diagrammatically a plan of the vehicle having double-driving axles.

Fig. 2 is a detail of the driving shaft.

Figures 3 and 4 are fragmentary views in plan and elevation, respectively, and partly in section of a modification of the invention.

Figures 5 and 6 are similar views of a further modification.

1 indicates a shaft which receives its motion from the motor element either directly or through the intermediary of various members, such as a clutch or coupling, change speed gear, etc., and the said shaft has a pinion 2 mounted thereon and driven thereby whilst at the same time being capable of sliding by means of keys or grooves 3.

Beneath the shaft 1 are arranged in a convenient manner two parallel shafts 4, 5, for the purpose of propagating the motion in the same direction or in the reverse direction and in two parallel directions in order to transmit the motion to the axles 6 and 7. On each of the shafts 4 and 5, pinions 8 and 9 are rigidly secured which are in engagement and consequently cause the said shafts to rotate in opposite directions. Each of the shafts 4 and 5 also have pinions 10 and 11 rigidly secured thereon adjacent the pinions 8 and 9 respectively.

The movable pinion 2 which is mounted on the shaft 1 may therefore be displaced in such a manner that it is capable of engaging with one or the other of the pinions 10 or 11, in such a manner as to transmit the motion directly to the one or the other of these pinions.

The shaft 1 turns always in the same direction; if the pinion 2 is displaced in such a manner as to engage with the pinion 10, then the shaft 4 will turn in consequence in the reverse direction to the shaft 1 and will transmit through the pinions 8 and 9 the motion to the shaft 5 whilst at the same time reversing the direction so that the latter will turn in the same direction as the shaft 1.

If, on the contrary, the pinion 2 is placed in engagement with the pinion 11 on the shaft 5, this will then turn in the reverse direction to the shaft 1 and will transmit its motion through the pinions 9 and 8 to the shaft 4, which will then turn in the same direction as the shaft 1.

Equally in each case, one of the shafts 4 and 5 receives its motion from the shaft 1 through one stage of gearing because the pinion 2 may be placed in engagement equally with the pinion 10 or pinion 11, whilst the other shaft will receive its motion in the first instance through two stages of gearing, that is to say through the gears 8 and 9 or vice versa.

The power is therefore transmitted by the shaft 1 with the same efficiency to the assembly of the two shafts 4 and 5 whatever may be the direction of rotation.

In the form of the invention shown on Figures 3 and 4, two toothed wheels 12 and 13 are rotatably mounted on the driving shaft 1 and are in permanent engagement with the wheels 10 and 11 of the shafts 4 and 5. A sleeve 14 having coupling claws is slidably keyed on the shaft 1 and is engageable with one or the other of the toothed wheels 12 and 13 for transmitting the motion to the shaft 5 through the shaft 4 or in a reverse direction to the shaft 4 through the shaft 5.

In the modification shown on Figures 5 and 6, the shaft 1 carries the toothed wheels 17 and 18 which are in permanent engagement with the wheels 15 and 16 mounted loosely on shafts 4 and 5. These wheels 15 and 16, in turn, may be coupled with the shafts 4 and 5 by means of the slidable coupling sleeves 19 and 20.

I claim:

1. A device for transmitting motion in two parallel directions with change of direction comprising a primary shaft driven by a source of power, two parallel secondary shafts connected by a gearing in permanent engagement, two similar gears on said secondary shafts and means for connecting at will said primary shaft with one or the other of said secondary shafts through the medium of one of said similar gears.

2. A device as claimed in claim 1 comprising on said primary shaft a slidable rotating toothed wheel which may be engaged with one of the similar gears rotating with the secondary shafts.

3. A device as claimed in claim 1 comprising on said primary shaft two toothed wheels in permanent engagement with the similar gears rotating with the secondary shafts and means for clutching one of said toothed wheels with said primary shaft.

4. A device as claimed in claim 1, comprising on said primary shaft two toothed wheels fixed to said shaft and in permanent engagement with the similar gears rotating freely on said secondary shafts and means for clutching one of said similar gears with the corresponding secondary shaft.

LEON SAIVES.